United States Patent
Nielson et al.

(10) Patent No.: US 12,385,673 B1
(45) Date of Patent: Aug. 12, 2025

(54) HIGH TEMPERATURE INDUSTRIAL HEAT PUMP WITH NOVEL METHOD TO MAKE USE OF SHALLOW LOW-GRADEGEOTHERMAL ENERGY

(71) Applicant: CAUSEWAY ENERGIES LLC, Washington, TX (US)

(72) Inventors: Jordan Nielson, San Antonio, TX (US); Simon Todd, Washington, TX (US)

(73) Assignee: CAUSEWAY ENERGIES LLC, Washington, TX (US)

( * ) Notice: Subject to any disclaimer, the term of this patent is extended or adjusted under 35 U.S.C. 154(b) by 0 days.

(21) Appl. No.: 18/863,404

(22) PCT Filed: Jun. 20, 2024

(86) PCT No.: PCT/US2024/034719
§ 371 (c)(1),
(2) Date: Nov. 6, 2024

(87) PCT Pub. No.: WO2025/006307
PCT Pub. Date: Jan. 2, 2025

Related U.S. Application Data

(60) Provisional application No. 63/523,146, filed on Jun. 26, 2023.

(51) Int. Cl.
*F24T 10/10* (2018.01)

(52) U.S. Cl.
CPC .................... *F24T 10/10* (2018.05)

(58) Field of Classification Search
CPC ...... F24T 10/10; F25B 9/008; F25B 2309/06; F25B 2309/061; F25B 11/02; F25B 1/053; F25B 2400/054; F25B 2400/13
See application file for complete search history.

(56) References Cited

U.S. PATENT DOCUMENTS

| | | | | |
|---|---|---|---|---|
| 4,984,432 A | * | 1/1991 | Corey | ............ F02G 1/043 417/69 |
| 9,388,817 B1 | | 7/2016 | Wright et al. | |

(Continued)

OTHER PUBLICATIONS

Cordin Arpagaus, Frederic Bless, Michael Uhlmann, Jürg Schiffmann, Stefan S. Bertsch, High temperature heat pumps: Market overview, state of the art, research status, refrigerants, and application potentials, http://www.elsevier.com/locate/energy, Mar. 31, 2018, pp. 985-1010.

(Continued)

*Primary Examiner* — Travis Ruby
(74) *Attorney, Agent, or Firm* — Ramey LLP

(57) ABSTRACT

An illustrative heat pump system includes: a positive displacement compressor, an expander, and a recuperator. The compressor provides an $sCO_2$ flow with a pressure $\geq 15$ MPa at a temperature $\geq 120°$ C. and a mass flow rate $\geq 4.5$ kg/s to deliver between 1 and 10 MWth of power to a thermal load. The recuperator receives an outlet flow from a thermal source such as a geothermal well thermosiphon and directs it as a compressor inlet flow to the compressor and receives a return flow from the thermal load and directs it to the expander while converting at least some residual heat in the return flow into additional heat for the compressor inlet flow. The expander converts at least some pressure of the return flow into power for the compressor, producing an inlet flow to the source with a pressure no higher than 5 MPa at a temperature no higher than 20° C.

20 Claims, 3 Drawing Sheets

(56) References Cited

U.S. PATENT DOCUMENTS

| | | | |
|---|---|---|---|
| 9,482,117 B2* | 11/2016 | Davidson | F01K 25/10 |
| 10,082,049 B2 | 9/2018 | Lee et al. | |
| 10,294,826 B2* | 5/2019 | Bandhauer | F01K 25/08 |
| 11,009,013 B2 | 5/2021 | Arnoux | |
| 11,466,907 B2* | 10/2022 | Bandhauer | F25B 6/04 |
| 2013/0269345 A1 | 10/2013 | Sonwane et al. | |
| 2016/0369658 A1 | 12/2016 | Lee et al. | |
| 2018/0340712 A1* | 11/2018 | Peter | F28D 20/02 |
| 2019/0056154 A1* | 2/2019 | Jansen | F25B 9/10 |
| 2020/0355169 A1 | 11/2020 | Arnoux | |
| 2024/0234757 A1 | 7/2024 | Hughes et al. | |

OTHER PUBLICATIONS

Xiaobing Liu, Yarom Polsky, Defeng Qian, Joshua Mcdonald, An Analysis on Cost Reduction Potential of Vertical Bore Ground Heat Exchangers Used for Ground Source Heat Pump Systems, 43rd Workshop on Geothermal Reservoir Engineering Stanford University, Stanford, California, Feb. 11-13, 2019, pp. 1-15.

Johann-Christoph Ebeling, Xing Luo, Stephan Kabelac, Sebastian Luckmann, Horst Kruse, Dynamic simulation and experimental validation of a two-phasec losed thermosyphon for geothermal application, www.sciencedirect.com, Jun. 23, 2017, pp. 107-116.

Hossein Ghazizade-Ahsaeea, Mehran Ameri, Effects of using expander and internal heat exchanger on carbon dioxide direct-expansion geothermal heat pump, https://www.elsevier.com/locate/apthermeng, Mar. 11, 2018, pp. 389-407.

Baomin Dai, Chen Liu, Shengchun Liu, Dabiao Wang, Qilong Wang, Tonghua Zou, Xuan Zhou, Life cycle techno-enviro-economic assessment of dual-temperature evaporation transcritical $CO_2$ high-temperature heat pump systems for industrial waste heat recovery, https://www.elsevier.com/locate/apthermeng, Oct. 28, 2022, pp. 1-21.

Parham Eslami-Nejad, Mohamed Ouzzane, Zine Aidoun, Modeling of a two-phase $CO_2$-filled vertical borehole for geothermal heat pump applications, http://www.elsevier.com/locate/apenergy, Nov. 6, 2013, pp. 611-620.

The Future of Heat Pumps, World Energy Outlook Special Report, Dec. 2022.

Kai-Hsiang Lin, Cheng-Shu Kuo, Wen-Der Hsieh, Chi-Chuan Wanga, Modeling and simulation of the transcritical $CO_2$ heat pump system, www.elsevier.com/locate/ijrefrig, Aug. 13, 2013, pp. 2048-2064.

Turboexpander, https://en.wikipedia.org/w/index.php?title=Turboexpander&oldid=1146025601 Nov. 6, 2024.

* cited by examiner

< 800 METERS

1

HIGH TEMPERATURE INDUSTRIAL HEAT PUMP WITH NOVEL METHOD TO MAKE USE OF SHALLOW LOW-GRADEGEOTHERMAL ENERGY

BACKGROUND

Geothermal heat pumps have become widely available for residential service, particularly in the northern United States, enabling homeowners to significantly reduce their carbon footprint. Such systems typically have capacities of no more than 20 thermal kilowatts (kWth). Various efforts have been made to scale such systems up for commercial and industrial use, e.g., to provide space heating, cooling, and domestic hot water for commercial buildings and campuses. Emerson has devised a 1 thermal megawatt (MWth) industrial heat pump that can provide a 45K lift to an 80° C. sink. MAN Energy Systems has a developed a large scale (>10 MWth) system, but it relies on components (e.g., turbines) that cannot be feasibly adapted for operation at smaller scales.

Unfortunately, the vast majority of industry (e.g., pharmaceutical, food/beverage, pulp/paper, and other manufacturing industries) has energy needs that lie within the 1 MWth to 10 MWth range where no feasible geothermal system designs yet exist, particularly not ones with an industrially suitable sink temperature comfortably above the boiling point of water (100° C.). The authors attribute this lack at least partly to the inability of conventional heat pumps to provide a temperature lift of more than 60K, consequently necessitating a higher source temperature, which for geothermal energy extraction in most parts of the world requires deep, costly boreholes. Another issue with conventional systems is their use of motors to circulate fluid through the ground loops or well, or to drive airflow over the coils. Such motors represent significant parasitic loads that harm the system's economic feasibility.

Yet given the intermittency/reliability issues and capital costs associated with other forms of alternative energy, geothermal systems nevertheless appear to represent industry's most feasible path to decarbonization if only a robust design can be found that is shown to be economically competitive with fossil fuel-based energy sources.

SUMMARY

Accordingly, there are disclosed herein a number of high temperature industrial heat pumps with associated methods for exploiting shallow geothermal energy as well as other low-grade thermal energy sources. The disclosed systems and methods may advantageously provide robust performance at levelized costs on par with existing fossil-fuel powered systems but without the corresponding greenhouse gas emissions. As detailed herein, certain operating parameter values and specific system configurations enable unexpected economic benefits to be achieved in the 1 MWth to 10 MWth range. In memory of co-inventor Jordan T. Nielson (1988-02-03-2023 Apr. 17), the pump cycle used by these system configurations is herein dubbed the "Nielson Cycle".

As provided by the appended claims, an illustrative heat pump system includes: a positive displacement compressor, an expander, and a recuperator. The positive displacement compressor provides a flow of supercritical carbon dioxide ($sCO_2$) with a pressure of at least 15 megapascals (MPa) at a temperature of at least 120° C. and a mass flow rate of at least 4.5 kg/s to deliver between 1 and 10 MWth of power to a thermal sink load. The recuperator receives an outlet flow from a thermal source and directs it as a compressor inlet flow to the positive displacement compressor, and also receives a return flow from the thermal sink load and directs it to the expander while converting at least some residual heat in the return flow from sink load into additional heat for the compressor inlet flow. The expander converts at least some pressure of the return flow into power for the compressor, producing an inlet flow to the source with a pressure no higher than 5 MPa at a temperature no higher than 20° C.

The foregoing system may be used to implement an illustrative method, which includes: operating a positive displacement compressor to provide a flow of supercritical carbon dioxide ($sCO_2$) with a pressure of at least 15 megapascals (MPa) at a temperature of at least 120° C. and a mass flow rate of at least 4.5 kg/s, the positive displacement compressor drawing a compressor inlet flow from a recuperator, the recuperator in turn receiving an outlet flow from a source, the source outlet flow having a pressure no higher than 5 MPa and a temperature no higher than 30° C.; with the recuperator, converting at least some residual heat in a return flow from the thermal sink load through the recuperator to an expander into additional heat for the compressor inlet flow; and with the expander, converting at least some pressure of the return flow into power for the positive displacement compressor, the expander producing an inlet flow to the source with a pressure no higher than 5 MPa at a temperature no higher than 20° C.

Each of the foregoing embodiments may be implemented individually or in combination and may be implemented with one or more of the following features in any suitable combination: 1. the source outlet flow has a temperature no higher than 30° C. 2. the source comprises a heat exchanger that receives heat from at least one of: a geothermal source, a solar thermal source, an aqua-thermal source (e.g., a lake), and a waste heat source (e.g., the discharge from cooling a data center). 3. the geothermal source comprises one or more wells each configured with a thermosiphon and each extending at least 100 m in depth. 4. each of the one or more wells extends no more than 800 m in depth. 5. the source includes multiple wells that share a cold manifold and a hot manifold connected by an internal heat exchanger element. 6. the one or more wells are each configured as a thermosiphon containing $sCO_2$ at a pressure in the range of 5 MPa to 9 MPa, inclusive. 7. the positive displacement compressor comprises one or more stages, at least one of which is at least in part powered by the expander. 8. the positive displacement compressor includes a screw compressor. 9. the expander is a gerotor type or a vaned type expander.

DETAILED DESCRIPTION

Figure 1:
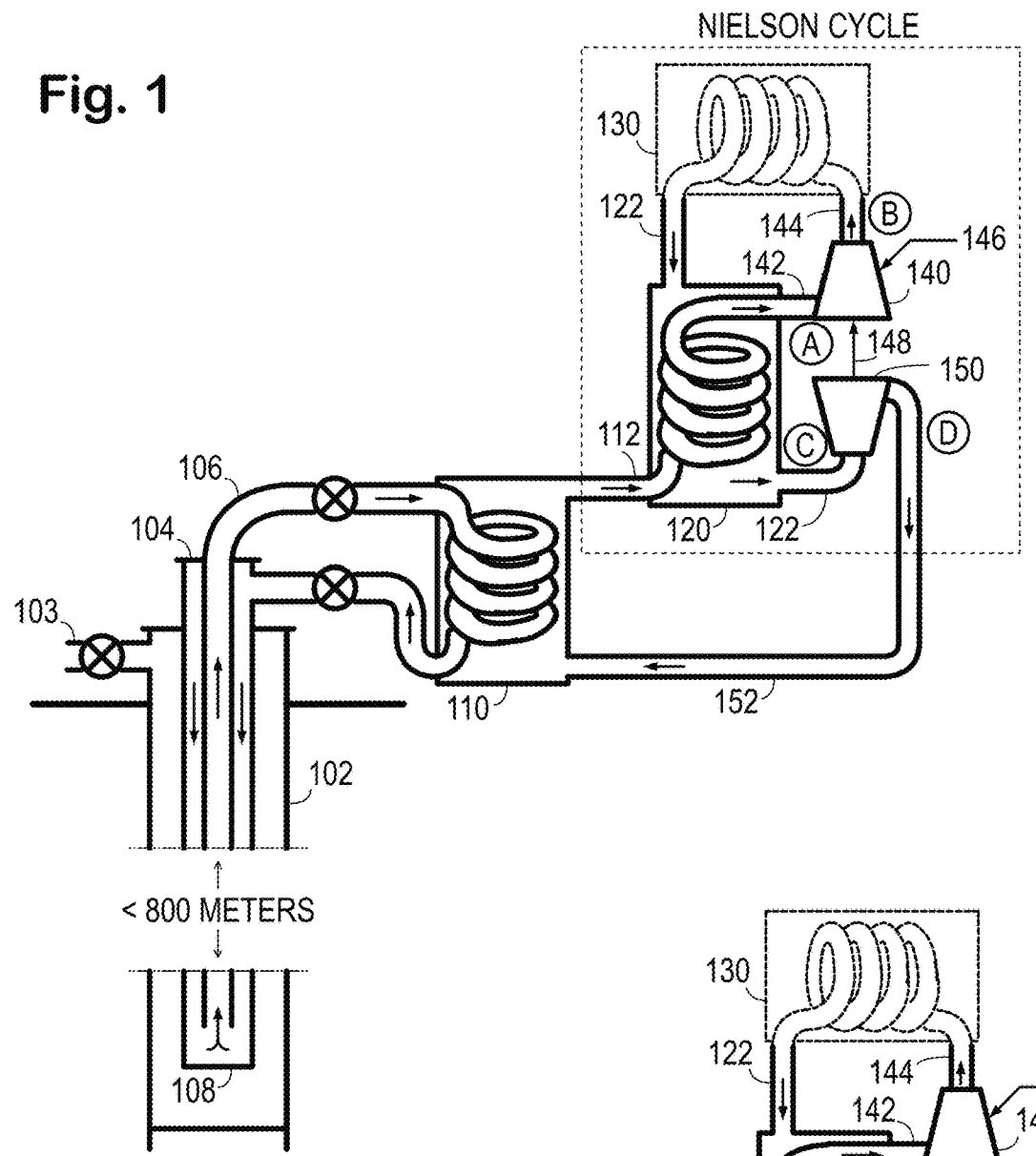
FIG. 1 is a schematic representation of a first illustrative geothermal high temperature industrial heat pump.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

The basic operating principles are now described with reference to FIG. 1. A well 102 is shown having a coaxial tubing arrangement with an outer tubing string 104 and an inner tubing string 106. The inner tubing string 106 separates the interior of the outer tubing string into a central bore and an annular passage. The annular passage connects to the central bore near the outer tubing string's terminal end 108. Though the well bore can be drilled to any desired depth, it is believed that, given an average geothermal gradient of 30° C. per kilometer depth and an average earth surface temperature of 15° C., the optimum economic return is achieved with a borehole depth between 400 and 800 meters, which is typically sufficient for the borehole to reach a geothermal reservoir temperature of about 40° C. without necessitating the use of unduly costly drilling time, equipment, materials, and processes. Even in high-gradient areas, a borehole depth of at least 100 meters is expected to reach the target reservoir temperature.

The economics of drilling are such that the cost of drilling a well is essentially linear to a certain depth, beyond which the cost begins to grow quadratically. This cost inflection depth can vary and is expected to grow over time as technology continues to improve, but it is currently around 800 meters. However, at a certain depth not far beyond the inflection depth, there is an economic crossover depth where it becomes less costly to drill another well than to extend the current well any deeper. With certain terrains and technologies, the crossover depth may be, say, 800 meters, 1000 meters, 1200 meters, or up to 1600 meters. The greater depths may offer greater enthalpy gains and enable the use of fewer boreholes.

The well 102 of FIG. 1 is shown with a well casing, though this is not a requirement. The outer tubing 104 is preferably provided with good thermal contact to the reservoir, e.g., with grouting or fluid (e.g., water) enabling sufficient heat flow between the outer tubing and the borehole wall. In some instances, the well casing may be perforated to enable groundwater to enter and exit the casing and/or the travel us the casing to exit through an outflow valve 103. This configuration provides additional advection and convection heat transfer in the subsurface strata which would otherwise occur by less effective conduction.

The inner tubing string 106 may be thermally insulated for at least some of its length to maximize enthalpy of the returning fluid. The tubing may be made of a composite material and/or provided with a coating and/or provided with a dual wall construction. In deeper versions of well 102 the upper part of the well casing if present or the outer tubing 104 if casing is not present may be insulated from the surrounding rocks to prevent thermal loss ("short-circuiting") from the downflowing fluid in the annulus passage if the well inflow temperature is more than the temperature of the shallowest subsurface strata. In some alternative implementations, the well 102 is made with a side-by-side tubing arrangement with the tubing strings connected at the bottom in the form of a U-shaped tube. The tubing strings need not be the same size, and indeed it may be preferred to provide the up-flow tubing with a larger cross section than the downflow tubing. In the case of the side-by-side tubing arrangement the upward tubing may be insulated to prevent thermal loss ("short-circuiting") to either the downward tubing or the surrounding grout or rocks.

Notably, it is desired for the well 102 to be configured as a thermosiphon so that it can deliver a steady heated fluid flow without need of pumps to circulate the fluid. To that end, FIG. 1 shows a fluid that circulates down the annular passage, returning to the surface via the central bore. The circulation fluid may be carbon dioxide ($CO_2$) pressurized to between 5 MPa and 9 MPa (725 to 1305 psi) at the surface with an injection temperature between 15° C. and 20° C. In one specific example, the injection temperature and pressure are about 18° C. at 6.75 MPa, providing a downhole vaporization temperature around 25° C. While thermosiphon performance depends on many factors, simulations suggest that each such thermosiphon can deliver a 10 to 15° C. temperature increase at a mass flow rate that translates into a 20 to 30 kWth heat flow. Multiple (e.g., 30 to 50 to more than 100) wells can be ganged together to collectively provide the desired heat flow energy to a heat exchanger 110.

Heat exchanger 110 provides an efficient thermal contact between the thermosiphon fluid path and the pump fluid path using coils, large contact surface areas, counterflow, and/or other design principles from the literature to maximize thermal transfer efficiency. The pump fluid may also be $CO_2$ pressurized at about 5 MPa. The thermosiphon fluid leaves the heat exchanger cooler than when it entered and is returned to the well. The pump fluid leaves the heat exchanger 110 via a source outlet 112 warmer than when it entered.

In accordance with the Nielson Cycle, a recuperator 120 receives the warmed pump fluid from the heat exchanger 110 and provides it with an efficient thermal contact to the return flow path 122 from a thermal load sink 130. Again, coils, large contact surface areas, counterflow, and/or other design principles from the heat exchange literature may be employed to maximize thermal transfer efficiency. Recuperator 120 uses residual heat in the return flow to provide additional heat to the heated pump fluid. The pump fluid flows to a compressor 140 warmer than when it entered the recuperator 120, and the return flow leaves the recuperator 120 cooler than when it entered.

Compressor 140 receives pump fluid from the recuperator 120 via a compressor inlet 142. Compressor 140 compresses the pump fluid from a pressure of about 5 MPa to above 15 MPa, e.g., 18 MPa, thereby raising the temperature to at least 120° C., and more preferably to 150° C. or more. The compressor 140 delivers supercritical $CO_2$ ($sCO_2$) with a mass flow rate of about 4.5 kg/s via the compressor outlet 144 to load 130. For improved efficiency, the compressor 140 may have multiple stages at least one of which is driven at least in part by power from an expander 150. Moreover, at least one stage is preferably a positive-displacement compressor. Various candidate designs can be used including a piston-based pump, a screw compressor, a scroll compressor, a gerotor pump, and a sliding-vane rotor technology such as a RadMax pump. For the target compression and mass flow rates, it is believed that a screw compressor will offer the best performance. The positive displacement pump may be driven with externally sourced power 146 preferably from a green energy source such as solar photovoltaics, wind, hydroelectric, etc. The compressor may also be driven with power 148 derived from the expander 150. One illustrative configuration of expander 150 shares a common shaft with a turbocompressor stage for compressor 140.

Thermal load 130 represents the 1 to 10 MWth industrial heat process sought to be powered by the heat pump. Examples include dryers, heaters, boilers, steam generators, steam rejuvenators, and thermoelectric generators. The thermal load 130 may include a heat exchanger and/or transfer piping to transfer heat to the target fluid or solid material so that the heat exchange occurs within a binary closed loop that keeps the pump fluid separate. In another method, the hot pump fluid is mixed together with the target material forming two phases within a single vessel, pipe, or container. After sufficient heat transfer is achieved, the pump fluid may be segregated to provide a return flow. Fluid returning via path 122 from the thermal sink is cooler than when it entered from the compressor 140 but may retain residual heat that can be transferred by the recuperator 120 to the compressor inlet flow 142. The recuperator 120 directs the return fluid flow 122 to expander 150 still at an elevated pressure above 15 MPa.

Figure 5:
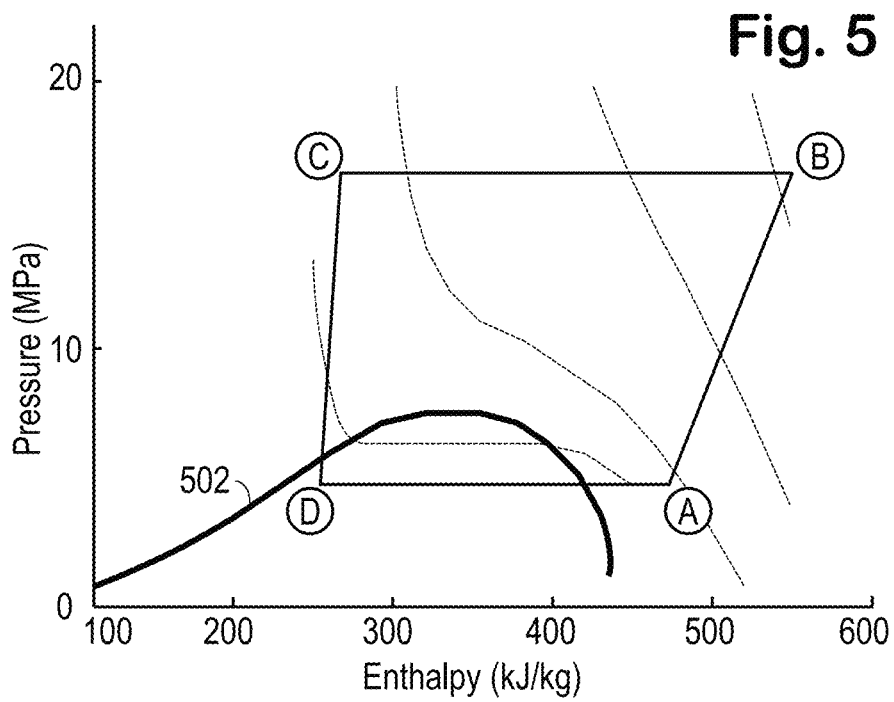
FIG. 5 is an enthalpy-pressure diagram of an illustrative pump cycle.

Expander 150 converts the elevated pressure of the return fluid flow to power 148 for driving compressor 140, yielding an inlet flow 152 for heat exchanger 110. The inlet flow 152 may have a pressure of about 5 MPa at a temperature below 20° C., e.g., about 15° C. FIG. 5 shows an enthalpy-pressure diagram representing the thermodynamic cycle for the pump fluid, with letters A-D representing the correspondingly marked points of the cycle in FIG. 1. Compressor 140 takes the pump fluid from point A to point B. As the pump fluid loses heat to the thermal load 130 and recuperator 120, the cycle traverses the B-C segment. The expander 150 takes the fluid along segment C-D, and the heat exchanger 110 and recuperator 120 implement the segment D-A.

We note that expander's operation extends below the saturation dome 502, where the pump fluid may be expected to enter the two-phase liquid-vapor regime. This transcritical cycle enables evaporation of the pump fluid to increase efficiency. Expander 150 may accordingly be implemented with two-phase operation in mind. A gerotor or a vaned expander (e.g., RadMax) configuration is expected to be particularly suitable for this application.

The parameter values given above are by way of explanation and do not themselves limit the scope of the claims. For example, the compressor 140 in certain alternative implementations provides higher compression ratios to deliver the pump fluid at higher pressures and temperatures to the thermal load 130. Pressures in the 20-30 MPa range and above are contemplated with temperatures of 200° C. or more.

Figure 2:
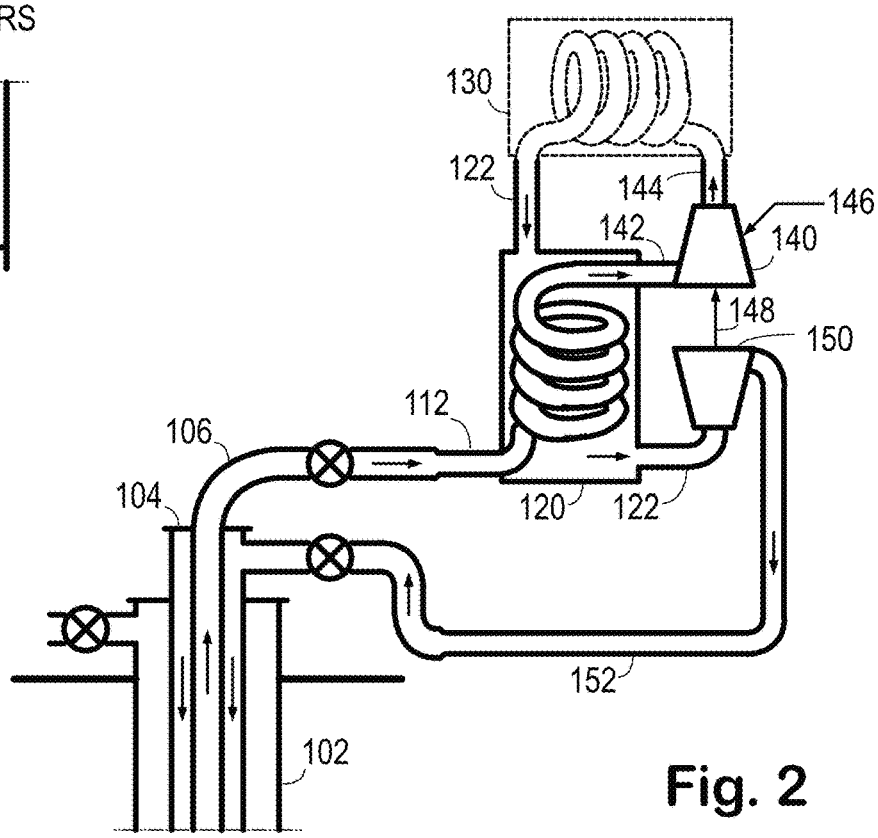
FIG. 2 is a schematic representation of a second illustrative geothermal high temperature industrial heat pump.

It is noted that the heat exchanger 110 provides certain benefits but does so at the cost of reducing heat transfer efficiency of the system. The benefits include the ability to operate the thermosiphon fluid at a pressure and mass flow rate that is independent of the pump fluid cycle, enabling the thermosiphon performance and pump cycle performance to be separately optimized. Nevertheless, the heat exchanger 110 is optional. FIG. 2 shows an alternative system implementation that omits heat exchanger 110, instead connecting the thermosiphon and pump components into a single cycle. The source inlet flow 152 is provided directly to downflow tubing 104, and the source outlet flow 112 is drawn directly from up flow tubing 106. For some industrial applications, the increase in heat transfer efficiency may offset the benefits of independent optimization of the thermosiphon and pump cycle operations.

Figure 3:
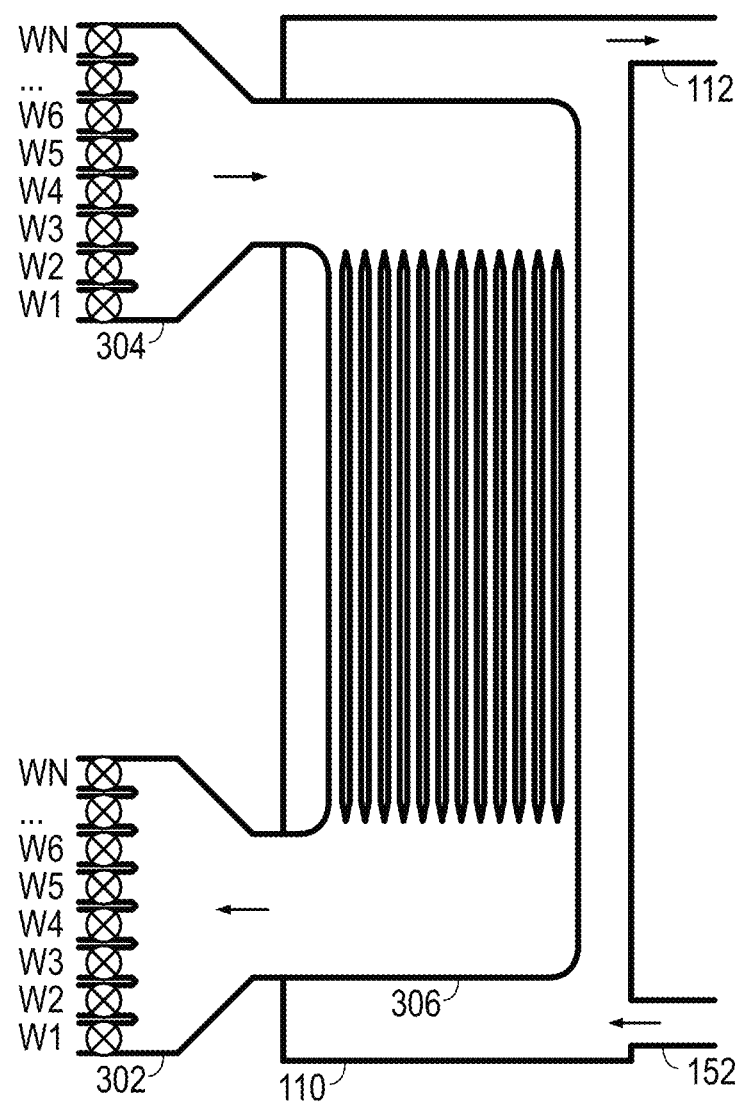
FIG. 3 is a schematic representation of an illustrative heat exchanger with intake and outlet manifolds.

As previously noted, multiple wells may be ganged together to provide the desired heat flow. The thermosiphon loops may be kept separate by, e.g., providing heat exchanger 110 with a separate coil for each well. Alternatively, shared manifolds may be employed as shown in FIG. 3. In FIG. 3, a heat exchanger 110 is equipped with a cold manifold 302 having multiple connectors for distributing thermosiphon fluid to the downflow tubing of each well $W_1$-$W_N$ and a hot manifold 304 with multiple connectors for collecting thermosiphon fluid from the up-flow tubing of each well. Each well has a corresponding connector to the cold manifold 302 and to the hot manifold 304. The manifold connectors may be individually valved to enable servicing of individual wells while the system continued to operate. The valves can also be used to regulate the flow distribution among the various thermosiphons. An internal element 306 provides a shared flow path through the heat exchanger 110 from the hot manifold 304 to the cold manifold 302. Though not shown here, the internal element 306 may have coils and/or fins to maximize heat transfer efficiency from the thermosiphons to the pump fluid. In system configurations where the heat exchanger 110 is omitted (e.g., FIG. 2), the hot manifold may be connected to a recuperator inlet and the cold manifold may be coupled to the expander outlet.

Figure 4:
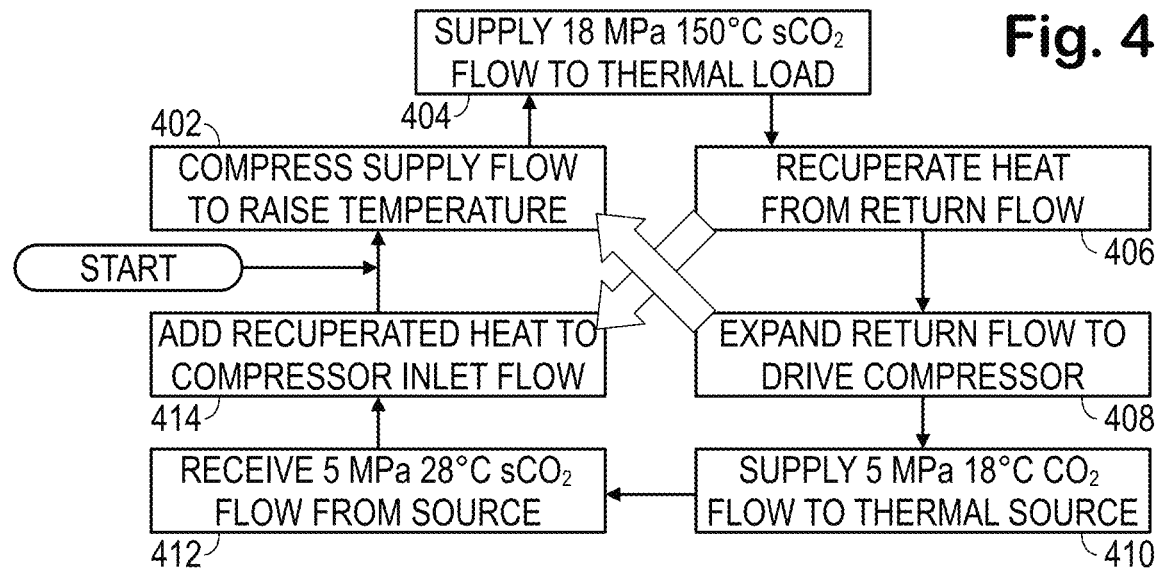
FIG. 4 is a flow diagram of an illustrative high temperature industrial heat pump method.

FIG. 4 is a flow diagram of an illustrative heat pump cycle that may be implemented by the above-described systems. In block 402, a positive displacement compressor compresses pump fluid from a pressure of around 5 MPa to a pressure above 15 MPa, e.g., 18 MPa, raising the temperature to 120° C. or more, e.g., 150° C. In block 404, the system supplies a mass flow of at least 4.5 kg/s from the compressor to the thermal load, which absorbs heat and lowers the temperature. In block 406, a recuperator receives a return flow from the thermal load so that residual heat energy in the return flow can be used to raise the temperature of a compressor inlet flow. In block 408, an expander converts pressure of the return flow into useful work for driving the compressor, thereby lowering the pressure and temperature of the return flow to about 5 MPa and below about 20° C., e.g., 18° C.

In block 410, the system supplies the low-pressure pump fluid to a thermal source such as, e.g., heat exchanger 110, which evaporates any liquid and raises the temperature by about 10° C. or more. In block 412, the system receives the source flow with a temperature of 28° C. or more. In block 412, a recuperator uses residual heat from the return flow to further heat the source flow before it passes to the compressor in block 402.

It is expected that the foregoing heat pump systems and methods will: 1) increase efficiency by incorporating an $sCO_2$ trans-critical cycle, 2) reduce compressor power requirements with recovery of high-pressure energy by the expander, 3) further reduce compressor requirements by minimizing the needed compressor pressure ratio due to recover of residual heat energy by the recuperator. The described geothermal system may further benefit from: 4) the low temperature of evaporation of trans-critical $CO_2$ (~25° C.) in the heat pump, enabling the use of relatively shallow boreholes to harvest heat; 5) a low-temperature $CO_2$ thermosiphon that eliminates the parasitic load of conventional electric pumps for circulation; and 6) fluid and material composition engineering together with optimization of component designs to maximize efficiency with minimal cost. This high-performance heat pump technology, scaled at 1 to 10 MWth, will meet the decarbonized heating requirements of an enormous market ($100 s billions per annum in financial terms) with an achievable Levelized Cost of Heat (LCOH) on par with that of a traditional gas burner without 30+ million tons of $CO_2$ that such a burner would have produced. Initial studies indicate that the disclosed system can achieve a 100 K temperature lift with a net coefficient of performance (COP) of at least 3.4.

Though geothermal energy is the preferred heat source for the foregoing designs, it is nevertheless recognized that comparable results can be achieved from other potentially available heat sources such as waste heat from industrial process exhaust flows; heat from decomposition of organic materials; or water bodies such as rivers, lakes, and oceans.

In summary, there has been disclosed:

(1) A system that comprises: a positive displacement compressor to provide a flow of supercritical carbon dioxide ($sCO_2$) with a pressure of at least 15 megapascals (MPa) at a temperature of at least 120° C. and a mass flow rate of at least 4.5 kg/s to deliver between 1 and 10 MWth of power to a thermal load; an expander; and a recuperator to receive a source outlet flow from a source and to direct it as a compressor inlet flow to the positive displacement compressor and to receive a return flow from the thermal load and to direct it to the expander while converting at least some residual heat in the return flow into additional heat for the compressor inlet flow, the expander configured to convert at least some pressure of the return flow into power for the positive displacement compressor yielding an inlet flow to the source with a pressure no higher than 5 MPa at a temperature no higher than 20° C.

(2) The system in (1), wherein the source outlet flow has a temperature no higher than 30° C.

(3) The system in (1) or (2), wherein the source comprises one or more wells each configured as a thermosiphon and each extending at least 100 m in depth.

(4) The system in (3), wherein each of the one or more wells extends no more than 800 m in depth.

(5) The system in (3) or (4), wherein the one or more wells are each configured as a thermosiphon containing $sCO_2$ at a pressure between 5 MPa and 9 MPa, inclusive.

(6) The system in any of (3) through (5), wherein each of the one or more wells configured as a thermosiphon has an up-flow tubing string that is insulated to reduce thermal loss.

(7) The system in any of (3) through (6), wherein each of the one or more wells has perforated casing for entry of groundwater into the casing.

(8) The system in any of (3) through (7), wherein the source comprises multiple wells coupled to a shared cold manifold and to a shared hot manifold.

(9) The system in any of (1) through (8), wherein the positive displacement compressor comprises one or more stages, and wherein the expander is configured to power at least one of the one or more stages.

(10) The system in any of (1) through (9), wherein the positive displacement compressor includes a screw compressor.

(11) The system in any of (1) through (10), wherein the expander comprises a gerotor.

(12) The system in any of (1) through (11), wherein the flow provided by the positive displacement compressor has a pressure of 18 MPa and a temperature of at least 150° C.

(13) A method that comprises: operating a positive displacement compressor to provide a flow of supercritical carbon dioxide ($sCO_2$) with a pressure of at least 18 megapascals (MPa) at a temperature of at least 150° C. and a mass flow rate of at least 4.5 kg/s to a thermal load, the positive displacement compressor drawing a compressor inlet flow from a recuperator, the recuperator in turn receiving an outlet flow from a source, the source outlet flow having a pressure no higher than 5 MPa and a temperature no higher than 30° C.; with the recuperator, converting at least some residual heat in a return flow into additional heat for the compressor inlet flow, the return flow passing from the thermal load through the recuperator to an expander; and, with the expander, converting at least some pressure of the return flow into power for the positive displacement compressor, the expander producing an inlet flow to the source with a pressure no higher than 5 MPa at a temperature no higher than 20° C.

(14) The method in (13), wherein the source comprises a heat exchanger that receives heat from at least one of: a geothermal source, a solar thermal source, an aqua-thermal source, and a waste heat source.

(15) The method in (13) or (14), wherein the source comprises one or more wells each configured as a coaxial tube-in-tube arrangement or a side-by-side U-tube arrangement and each extending at least 100 m in depth.

(16) The method in (15), further comprising using a hot manifold to collect up flow from multiple wells and a cold manifold to distribute downflow to the multiple wells.

(17) The method in (16), further comprising using an internal element to convey flow from the hot manifold through a heat exchanger to the cold manifold.

(18) The method in any of (15) through (17), wherein the multiple wells each includes an up-flow tube that is insulated to reduce thermal loss.

(19) The method in any of (13) through (18), wherein the positive displacement compressor comprises one or more stages, and wherein the method comprises driving at least one of the one or more stages with the power from the expander.

(20) The method in any of (13) through (19), wherein the positive displacement compressor includes a screw compressor.

Numerous alternative forms, equivalents, and modifications will become apparent to those skilled in the art once the above disclosure is fully appreciated. It is intended that the claims be interpreted to embrace all such alternative forms, equivalents, and modifications where applicable.

What is claimed is:

1. A system that comprises:
    a positive displacement compressor to provide a flow of supercritical carbon dioxide ($sCO_2$) with a pressure of at least 15 megapascals (MPa) at a temperature of at least 120° C. and a mass flow rate of at least 4.5 kg/s to deliver between 1 and 10 MWth of power to a thermal load;
    an expander; and
    a recuperator to receive a source outlet flow from a source and to direct it as a compressor inlet flow to the positive displacement compressor and to receive a return flow from the thermal load and to direct it to the expander while converting at least some residual heat in the return flow into additional heat for the compressor inlet flow,
    the expander configured to convert at least some pressure of the return flow into power for the positive displacement compressor yielding an inlet flow to the source with a pressure no higher than 5 MPa at a temperature no higher than 20° C.

2. The system of claim 1, wherein the source outlet flow has a temperature no higher than 30° C.

3. The system according to claim 1, wherein the source comprises one or more wells each configured as a thermosiphon and each extending at least 100 m in depth.

4. The system of claim 3, wherein each of the one or more wells extends no more than 800 m in depth.

5. The system according to claim 3, wherein the one or more wells are each configured as a thermosiphon containing $sCO_2$ at a pressure between 5 MPa and 9 MPa, inclusive.

6. The system according to claim 3, wherein each of the one or more wells configured as a thermosiphon has an up-flow tubing string that is insulated to reduce thermal loss.

7. The system according to claim 3, wherein each of the one or more wells has perforated casing for entry of groundwater into the casing.

8. The system according to claim 3, wherein the source comprises multiple wells coupled to a shared cold manifold and to a shared hot manifold.

9. The system according to claim 1, wherein the positive displacement compressor comprises one or more stages, and wherein the expander is configured to power at least one of the one or more stages.

10. The system according to claim 1, wherein the positive displacement compressor includes a screw compressor.

11. The system according to claim 1, wherein the expander comprises a gerotor.

12. The system according to claim 1, wherein the flow provided by the positive displacement compressor has a pressure of 18 MPa and a temperature of at least 150° C.

13. A method that comprises:
operating a positive displacement compressor to provide a flow of supercritical carbon dioxide (sCO$_2$) with a pressure of at least 18 megapascals (MPa) at a temperature of at least 150° C. and a mass flow rate of at least 4.5 kg/s to a thermal load, the positive displacement compressor drawing a compressor inlet flow from a recuperator, the recuperator in turn receiving an outlet flow from a source, the source outlet flow having a pressure no higher than 5 MPa and a temperature no higher than 30° C.;
with the recuperator, converting at least some residual heat in a return flow into additional heat for the compressor inlet flow, the return flow passing from the thermal load through the recuperator to an expander; and
with the expander, converting at least some pressure of the return flow into power for the positive displacement compressor, the expander producing an inlet flow to the source with a pressure no higher than 5 MPa at a temperature no higher than 20° C.

14. The method according to any of claim 13, wherein the source comprises a heat exchanger that receives heat from at least one of: a geothermal source, a solar thermal source, an aqua-thermal source, and a waste heat source.

15. The method according to claim 13, wherein the source comprises one or more wells each configured as a coaxial tube-in-tube arrangement or a side-by-side U-tube arrangement and each extending at least 100 m in depth.

16. The method according to any of claim 15, further comprising using a hot manifold to collect up flow from multiple wells and a cold manifold to distribute downflow to the multiple wells.

17. The method according to any of claim 16, further comprising using an internal element to convey flow from the hot manifold through a heat exchanger to the cold manifold.

18. The method according to claim 15, wherein at least one of the multiple wells includes an up-flow tube that is insulated to reduce thermal loss.

19. The method according to claim 13, wherein the positive displacement compressor comprises one or more stages, and wherein the method comprises driving at least one of the one or more stages with the power from the expander.

20. The method according to claim 13, wherein the positive displacement compressor includes a screw compressor.

* * * * *